United States Patent
Quinn et al.

(10) Patent No.: US 9,437,851 B2
(45) Date of Patent: Sep. 6, 2016

(54) ELECTRIC STORAGE BATTERY SUPPORT APPARATUS

(75) Inventors: Shawn G. Quinn, Grand Blanc, MI (US); Gregory J. Fadler, Commerce Township, MI (US); Brian J. Schachermeyer, Sterling Heights, MI (US); David B. Declerck, Auburn Hills, MI (US); Milind S Gandhi, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1804 days.

(21) Appl. No.: 12/608,154

(22) Filed: Oct. 29, 2009

(65) Prior Publication Data

US 2011/0104558 A1    May 5, 2011

(51) Int. Cl.
H01M 2/10 (2006.01)
H01M 10/625 (2014.01)
H01M 10/613 (2014.01)
H01M 10/658 (2014.01)

(52) U.S. Cl.
CPC ......... *H01M 2/1077* (2013.01); *H01M 2/1072* (2013.01); *H01M 2/1083* (2013.01); *H01M 10/613* (2015.04); *H01M 10/625* (2015.04); *H01M 10/658* (2015.04)

(58) Field of Classification Search
USPC .................................... 429/163, 96, 99, 100
See application file for complete search history.

(56) References Cited

U.S. PATENT DOCUMENTS

| 3,591,400 | A | * | 7/1971 | Palmquist et al. . | A41D 31/0011 2/81 |
|---|---|---|---|---|---|
| 5,278,002 | A | * | 1/1994 | Hiers | H01M 2/1094 429/120 |
| 5,378,555 | A | * | 1/1995 | Waters | H01M 2/1083 180/68.5 |
| 6,102,356 | A | * | 8/2000 | Huntley | B60R 16/04 248/500 |
| 6,510,833 | B1 | * | 1/2003 | Anthon | 123/198 E |
| 2002/0093246 | A1 | * | 7/2002 | Takahashi | B60K 1/04 307/9.1 |
| 2003/0039575 | A1 | * | 2/2003 | Uchida | C22C 23/02 420/405 |
| 2006/0068278 | A1 | * | 3/2006 | Bloom | H01B 3/025 429/176 |

FOREIGN PATENT DOCUMENTS

| CN | 1401805 A | 3/2003 |
|---|---|---|
| CN | 1606657 A | 4/2005 |

* cited by examiner

Primary Examiner — Scott J Chmielecki

(57) ABSTRACT

An apparatus for supporting a battery comprises a tray including a support surface, a recess having a elevation that is lower than an elevation of the support surface, ribs located in the recess and extending to the elevation of the support surface, thermal insulation supported on the ribs and the upper surface, and a battery contacting the insulation and supported on the ribs and the support surface.

2 Claims, 2 Drawing Sheets

ELECTRIC STORAGE BATTERY SUPPORT APPARATUS

BACKGROUND OF INVENTION

The present invention relates generally to an apparatus for supporting and insulating an electric storage battery in an electric vehicle.

A rechargeable electric storage battery is mounted on a tray and located at the underside of a vehicle with its lower surface exposed to the road. It has been conventional practice to form such battery trays in multiple pieces of high strength material, with such multiple stampings welded together. The lower surface of the tray is covered with a panel. Such battery tray panels, however, have a large number of indentations and holes for fasteners, which increase aerodynamic drag on the vehicle.

A battery tray casting in one-piece would reduce overall complexity of a battery tray formed of multiple welded stampings. Preferably the lower surface of a one-piece tray would reduce aerodynamic drag and avoid the need for a panel covering bolted to the bottom of the battery tray.

SUMMARY OF INVENTION

An apparatus for supporting a battery comprises a tray including a support surface, a recess having a elevation that is lower than an elevation of the support surface, ribs located in the recess and extending to the elevation of the support surface, thermal insulation supported on the ribs and the upper surface, and a battery contacting the insulation and supported on the ribs and the support surface.

The tray insulates the batteries against harm due to the ambient air temperature in the operating environment.

The tray is formed as a one-piece casting that minimizes aerodynamic drag without need for a cover over the underside of the tray.

The one piece design minimizes mass and the number of fasteners. Because tooling normally used to accommodate a multi-piece design is not required during vehicle assembly and component assembly, the tray design minimizes piece cost and requires low investment cost and reduces tooling lead time.

The ribs enable the structural, crash, and durability requirements of the tray to be realized.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
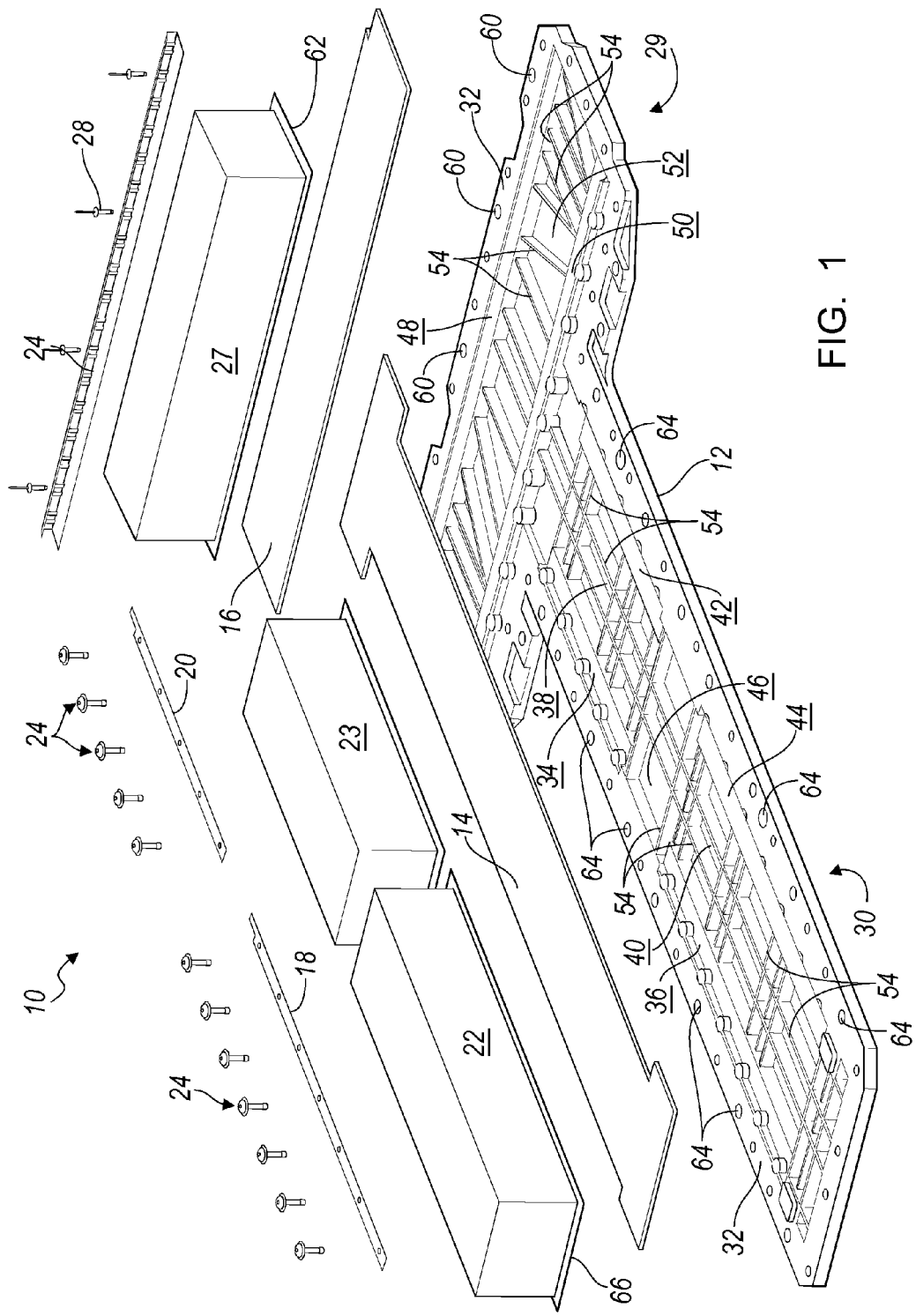
FIG. 1 is a perspective view of a battery tray assembly showing the components in spaced relationship.

Referring now to the drawings, there is illustrated in FIG. 1 a battery support assembly 10, which includes a tray 12; sheets of thermal insulation 14, 16; fastening strips 18, 20 for securing a lateral edge of batteries 22, 23 to the tray; screws 24 for securing the fastening strips to the tray; a channel 26 for securing battery 27 to the tray; and rivets 28 for securing the channel 26 to the tray.

Tray 12 is preferably a casting of magnesium alloy, which when viewed from above is tee-shaped having a cross leg 29 and a stem 30. The upper surface of the tray 12 comprises multiple planar support surfaces and a flat plane 32, which extends around an outer periphery of the tray 12 and is located outboard of the support surfaces.

Two of the support surfaces 34, 36 extend adjacent to plane 32 along the left-hand side of rectangular recesses 38, 40 formed in the stem 30.

Two of the support surfaces 42, 44, adjacent to plane 32, extend along the right-hand side of the rectangular recesses 38, 40 in stem 30.

Another of the support surfaces 46 extends laterally across the width of the stem 30 between the recesses 38, 40.

Two of the support surfaces 48, 50 extend laterally along the length of a rectangular recess 52 formed in the cross leg 29. Support surface 48 is located between the peripheral plane 32 and the recess 52. The elevation of the plane 32 and support surfaces 34, 36, 42, 44, 46, 48, 50 is approximately identical and higher than the elevation of the base of the recesses 38, 40, 52.

The rectangular recess 52 formed in cross leg 29 extends along the length of the cross leg and contains ribs 54, which extend upward from the floor of recess 52 to the elevation of the plane 32 and support surfaces 48, 50. Similarly, the rectangular recesses 38, 40 formed in stem 30 extend along the length of the stem and contain ribs 54, which extend upward from the floor of recesses 38, 40 to the elevation of the upper tray surface, which comprises the plane 32 and support surfaces 34, 36, 42, 44, 46, 48, 50.

The sheet 14 of thermal insulation is supported on the upper surface of the ribs 54 in the recesses 38, 40 of the stem 30 and on support surfaces 34, 36, 42, 44, 46. The sheet 16 of thermal insulation is supported on the upper surface of the ribs 54 located in the recess 52 of the cross leg 29 and on support surfaces 48, 50.

The length of the tray's peripheral plane 32 that extends along the cross leg 29 is formed with rivet holes 60, each hole containing a rivet 28, which secures channel 24 to the tray 12. Channel 24 engages a rim 62 that extends from a lower surface of battery 27, whereby that battery is secured to the tray 12.

The length of the tray's peripheral plane 32 that extends along the stem 30 is formed with screw holes 64, each hole containing a screw 24, which secures the fastening strips 18, 20 to the tray 12. Fastening strips 18, 20 engage rims 66 that extend from a lower surface of batteries 22, 23, whereby each of these batteries is secured to the tray 12.

After the insulation sheets 14, 16 are placed in position on the upper surface of the tray 12, the batteries 22, 23, 27 are installed on the upper aluminum foil of the insulation sheets and secured to the tray 12 using the channel 24, rivets 28, fastening strips 18, 20 and screws 24.

Figure 2:
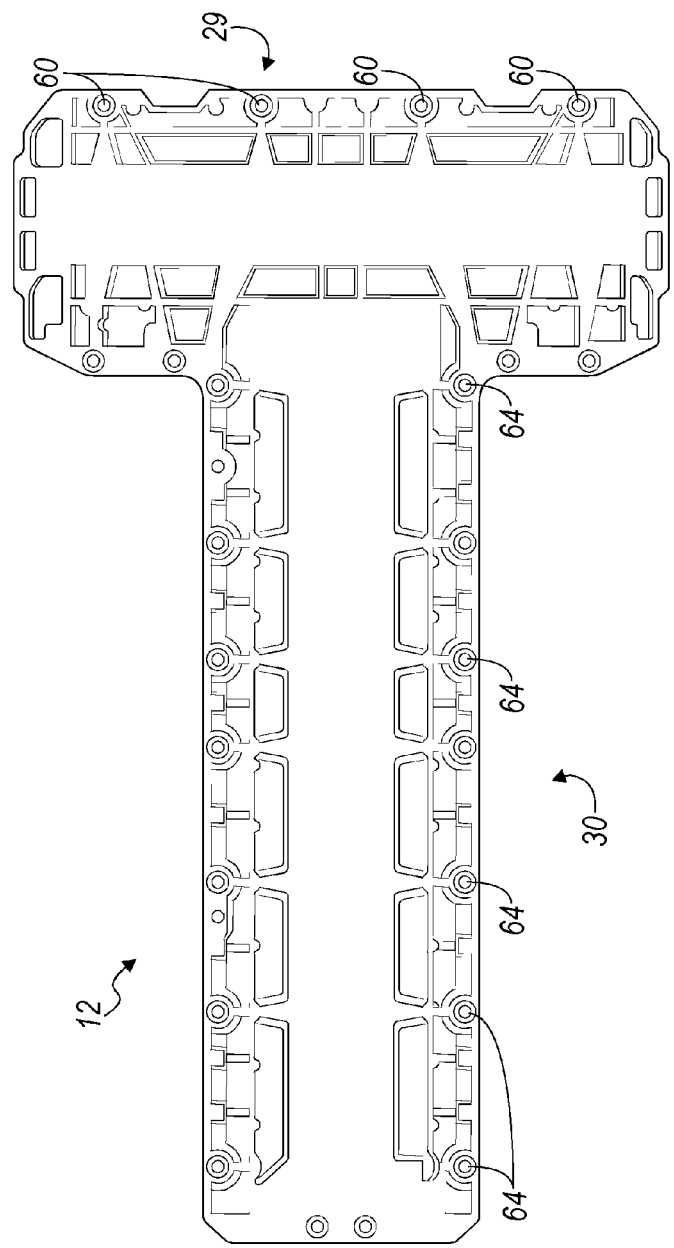
FIG. 2 is a bottom view showing the lower surface of the tray.
Figure 3:
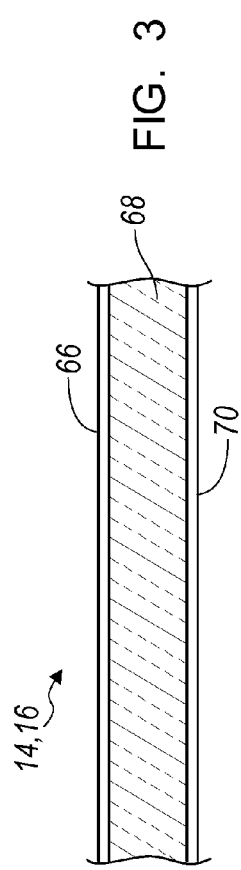
FIG. 3 is a cross section through the thickness of an insulation sheet.

FIG. 2 is a plan view showing the lower surface of the tray 12 formed with depressions to lighten the tray. The depth of the depressions on the lower surface may be in the range 2.4 mm to 2.7 mm.

Each insulation sheet 14, 16 has a preferred thickness of about 2.0 mm and comprises an upper thin reflective sheet of aluminum 66 contacting the bottom surface of a battery 22, 23, 27, a layer of thermal insulation 68 immediately below the reflective sheet, and a thin coating of adhesive 70, by which the insulation layer is bonded to the ribs 54 and support surfaces 34, 36, 42, 44, 46, 48, 50.

A preferred material for the insulation sheets 14, 16 is GMN10046 TYPE II insulation, known commercially as VitReflect ADH and available from Vitrica, S. A. de C. V., located in Mexico City. The tray can produce effective results using any of several suitable alternative insulation materials, such as AeroGel, that can be manufactured to conform to the shaped pockets formed by the ribs in the recesses 38, 40, 52.

The overall length of the tray is about 1640 mm. The width of the cross leg 30 is about 934 mm. The width of the stem 30 is about 395 mm. The thickness of plane 32 and surfaces is about 15.7 mm. The depth of the recesses 38, 40, 46, 52 below plane 32 is about 13.00 mm.

While certain embodiments of the present invention have been described in detail, those familiar with the art to which this invention relates will recognize various alternative designs and embodiments for practicing the invention as defined by the following claims.

What is claimed is:

1. An apparatus for supporting a battery, comprising:

a tray having a cross leg and a stem, the tray including a support surface, a first recess formed in the cross leg, a second and a third recess formed in the stem, each of the recesses having an elevation that is lower than an elevation of the support surface, and ribs located in the recesses and extending to the elevation of a top of the respective adjacent support surfaces;

a first thermal insulation sheet in direct contact with and supported on the ribs and in direct contact with the support surface of the cross leg;

a second thermal insulation sheet in direct contact with and supported on the ribs and in direct contact with the support surface of the stem;

a first battery contacting the first insulation sheet and supported on the ribs and contacting and supported on the support surface of the cross leg;

a second battery contacting the second insulation sheet and supported on the ribs of the second recess and contacting and supported on the support surface of the stem;

a third battery contacting the second insulation sheet and supported on the ribs of the third recess and contacting and supported on the support surface of the stem; and wherein the tray further comprises a horizontal plane surrounding at least a portion of the recesses and located outboard of the support surface, the batteries affixed on top of the horizontal plane.

2. An apparatus for supporting a battery, comprising:

a tray having a cross leg and a stem, the tray including a support surface, a first recess formed in the cross leg, a second and a third recess formed in the stem, each of the recesses having an elevation that is lower than an elevation of the support surface, and ribs located in the recesses and extending to the elevation of a top of the respective adjacent support surfaces;

a first thermal insulation sheet in direct contact with and supported on the ribs and in direct contact with the support surface of the cross leg;

a second thermal insulation sheet in direct contact with and supported on the ribs and in direct contact with the support surface of the stem;

a first battery contacting the first insulation sheet and supported on the ribs and contacting and supported on the support surface of the cross leg;

a second battery contacting the second insulation sheet and supported on the ribs of the second recess and contacting and supported on the support surface of the stem;

a third battery contacting the second insulation sheet and supported on the ribs of the third recess and contacting and supported on the support surface of the stem; and wherein the tray further comprises a horizontal plane surrounding at least a portion of the recess and located outboard of the support surface; and fastening devices, each engaged with one of the batteries and secured to the horizontal plane, securing the batteries on top of the horizontal plane.

* * * * *